US012669614B2

(12) United States Patent
Chattopadhyay et al.

(10) Patent No.: US 12,669,614 B2
(45) Date of Patent: Jun. 30, 2026

(54) LiDAR-BASED OBJECT TRACKING

(71) Applicant: Intel Corporation, Santa Clara, CA (US)

(72) Inventors: Rita Chattopadhyay, Chandler, AZ (US); Jun Cao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 18/281,244

(22) PCT Filed: Mar. 21, 2022

(86) PCT No.: PCT/US2022/021178
§ 371 (c)(1),
(2) Date: Sep. 8, 2023

(87) PCT Pub. No.: WO2023/009180
PCT Pub. Date: Feb. 2, 2023

(65) Prior Publication Data
US 2024/0151855 A1      May 9, 2024

Related U.S. Application Data

(60) Provisional application No. 63/226,861, filed on Jul. 29, 2021.

(51) Int. Cl.
*G01S 17/931* (2020.01)
*G01S 7/48* (2006.01)
(Continued)

(52) U.S. Cl.
CPC .......... *G01S 17/931* (2020.01); *G01S 7/4808* (2013.01); *G01S 17/46* (2013.01); *G01S 17/89* (2013.01)

(58) Field of Classification Search
CPC ...... G01S 17/931; G01S 7/4808; G01S 17/46; G01S 17/89; G01S 7/4802
See application file for complete search history.

(56) References Cited

U.S. PATENT DOCUMENTS 5,966,678  A    10/1999  Lam
6,302,355  B1    10/2001  Sallee et al.
(Continued)

FOREIGN PATENT DOCUMENTS

CN          102142194          8/2011
CN          102855460          1/2013
(Continued)

OTHER PUBLICATIONS

"U.S. Appl. No. 15/850,246, Notice of Allowance mailed Aug. 16, 2019", 9 pgs.
(Continued)

*Primary Examiner* — Keith D Bloomquist
(74) *Attorney, Agent, or Firm* — Banner & Witcoff, Ltd.

(57)                    ABSTRACT

Various systems and methods for implementing LiDAR-based object tracking described herein. An object tracking system for a vehicle includes an interface to communicate with object detection circuitry and an object similarity calculator circuitry, to obtain segmented data of an environment the object tracking system is operating within, the segmented data obtained using a light imaging detection and ranging (LiDAR) system, and the segmented data including a first plurality of segments detected in a first frame and a second plurality of segments detected in a second frame, the second frame captured after the first frame; determine, for a given segment of the first plurality of segments, a similar segment in the second plurality of segments; assign an VEHICLE object identification of the given segment to the
(Continued)

similar segment; and track the similar segment from the first frame to the second frame based on the object identification.

17 Claims, 12 Drawing Sheets

(51) Int. Cl.
    *G01S 17/46*        (2006.01)
    *G01S 17/89*        (2020.01)

(56) References Cited

U.S. PATENT DOCUMENTS

| | | | |
|---|---|---|---|
| 7,995,055 B1 | 8/2011 | Ma et al. | |
| 8,761,498 B1 | 6/2014 | Wu | |
| 9,014,905 B1 | 4/2015 | Kretzschmar et al. | |
| 9,412,271 B2 | 8/2016 | Sharma | |
| 10,509,947 B1 | 12/2019 | Douillard et al. | |
| 10,510,154 B2 | 12/2019 | Chattopadhyay et al. | |
| 10,909,392 B1 * | 2/2021 | Chaudhuri | G05D 1/0214 |
| 11,187,793 B1 * | 11/2021 | Liu | G05D 1/0214 |
| 11,747,444 B2 | 9/2023 | Chattopadhyay et al. | |
| 11,887,335 B2 | 1/2024 | Kavulya et al. | |
| 2002/0048395 A1 | 4/2002 | Harman et al. | |
| 2005/0286767 A1 | 12/2005 | Hager et al. | |
| 2010/0034422 A1 | 2/2010 | James et al. | |
| 2010/0111396 A1 | 5/2010 | Boucheron | |
| 2014/0334719 A1 | 11/2014 | Takenaka et al. | |
| 2014/0341421 A1 | 11/2014 | Porikli et al. | |
| 2015/0109603 A1 | 4/2015 | Kim et al. | |
| 2015/0221079 A1 | 8/2015 | Schultz et al. | |
| 2017/0031015 A1 * | 2/2017 | Mei | G01S 13/931 |
| 2017/0091578 A1 | 3/2017 | Ananthakrishnan et al. | |
| 2017/0169208 A1 | 6/2017 | Jantz et al. | |
| 2017/0270375 A1 | 9/2017 | Grauer | |
| 2017/0307746 A1 | 10/2017 | Rohani et al. | |
| 2018/0067490 A1 | 3/2018 | Pollach et al. | |
| 2018/0144202 A1 | 5/2018 | Moosaei et al. | |
| 2018/0189950 A1 | 7/2018 | Norouzi et al. | |
| 2018/0203113 A1 | 7/2018 | Taylor et al. | |
| 2018/0232583 A1 | 8/2018 | Wang et al. | |
| 2018/0356527 A1 | 12/2018 | Kozak et al. | |
| 2018/0365506 A1 | 12/2018 | Clifford et al. | |
| 2019/0049560 A1 | 2/2019 | Chattopadhyay et al. | |
| 2019/0051006 A1 | 2/2019 | Chattopadhyay et al. | |
| 2019/0187720 A1 | 6/2019 | Fowe | |
| 2019/0285752 A1 | 9/2019 | Chattopadhyay et al. | |
| 2019/0377814 A1 | 12/2019 | Shtrom et al. | |
| 2020/0118278 A1 | 4/2020 | Mei et al. | |
| 2020/0134372 A1 * | 4/2020 | Roy Chowdhury | G05D 1/0221 |
| 2020/0184259 A1 * | 6/2020 | Viswanathan | G06V 10/7715 |
| 2020/0217952 A1 | 7/2020 | Rider et al. | |

FOREIGN PATENT DOCUMENTS

| | | |
|---|---|---|
| CN | 104123533 | 10/2014 |
| CN | 107025443 | 8/2017 |
| CN | 109961001 A | 7/2019 |
| CN | 110826386 A | 2/2020 |
| DE | 102018129251 A1 | 6/2019 |
| DE | 102019118999 A1 | 2/2020 |
| EP | 3845428 A1 | 7/2021 |
| WO | WO-2023009180 A1 | 2/2023 |

OTHER PUBLICATIONS

"U.S. Appl. No. 16/103,674, Advisory Action mailed May 13, 2022", 4 pgs.

"U.S. Appl. No. 16/103,674, Corrected Notice of Allowability mailed May 16, 2023", 2 pgs.

"U.S. Appl. No. 16/103,674, Examiner Interview Summary mailed Mar. 25, 2022", 2 pgs.

"U.S. Appl. No. 16/103,674, Final Office Action mailed Mar. 4, 2022", 10 pgs.

"U.S. Appl. No. 16/103,674, Final Office Action mailed Jun. 8, 2021", 11 pgs.

"U.S. Appl. No. 16/103,674, Final Office Action mailed Dec. 9, 2022", 6 pgs.

"U.S. Appl. No. 16/103,674, Non Final Office Action mailed Feb. 23, 2021", 11 pgs.

"U.S. Appl. No. 16/103,674, Non Final Office Action mailed Aug. 19, 2022", 10 pgs.

"U.S. Appl. No. 16/103,674, Non Final Office Action mailed Nov. 15, 2021", 10 pgs.

"U.S. Appl. No. 16/103,674, Notice of Allowance mailed Apr. 26, 2023", 7 pgs.

"U.S. Appl. No. 16/103,674, Response filed Feb. 15, 2022 to Non Final Office Action mailed Nov. 15, 2021", 11 pgs.

"U.S. Appl. No. 16/103,674, Response filed Apr. 10, 2023 to Final Office Action mailed Dec. 9, 2022", 9 pgs.

"U.S. Appl. No. 16/103,674, Response filed May 4, 2022 to Final Office Action mailed Mar. 4, 2022", 10 pgs.

"U.S. Appl. No. 16/103,674, Response filed May 24, 2021 to Non Final Office Action mailed Feb. 23, 2021", 10 pgs.

"U.S. Appl. No. 16/103,674, Response filed Sep. 8, 2021 to Final Office Action mailed Jun. 8, 2021", 10 pgs.

"U.S. Appl. No. 16/103,674, Response filed Nov. 21, 2022 to Non Final Office Action mailed Aug. 19, 2022", 9 pgs.

"International Application Serial No. PCT/US2022/021178, International Search Report mailed Nov. 23, 2022", 3 pgs.

"International Application Serial No. PCT/US2022/021178, Written Opinion mailed Nov. 23, 2022", 4 pgs.

"Velodyne HDL-64 Object Detection by LSA Autonomy", https://www.youtube.com/watch?v=q-Rz3BD7KKo, (Nov. 10, 2015), Video.

Asvadi, Alireza, "Detection and Tracking of Moving Objects Using 2.5D Motion Grids", https://www.youtube.com/watch?v=3jZ8znHyWts, (May 29, 2016), Video.

Asvadi, Alireza, "REal-Time Deep ConvNet-based Vehicle Detection Using 3D-Lidar Reflection Intensity Data", https://www.youtube.com/watch?v=1JJHihvp7NE, (Sep. 4, 2017), Video.

Ester, Martin, et al., "A Density-Based Algorithm for Discovering Clusters in Large Spatial Databases with Noise", In: Proceedings of 2nd International Conference on Knowledge Discovery and Data Mining, KDD '96, (1996), 226-231.

Himmelsback, M, et al., "LIDAR-based 3D Object Perception", Proceedings of 1st International Workshop on Cognition for technical Systems, (2008), 7 pgs.

Wang, Chunxiao, et al., "An Improved DBSCAN Method for LiDAR Data Segmentation with Automatic Eps Estimation", Sensors (Basel, Switzerland)vol. 19, 1 172, doi: 10.3390/s19010172 (Year: 2019), (Jan. 5, 2019), 26 pgs.

"International Application Serial No. PCT US2022 021178, International Preliminary Report on Patentability mailed Feb. 8, 2024", 6 pgs.

"Chinese Application Serial No. 201811391595.2, Office Action mailed Dec. 18, 2024", w English translation, 28 pgs.

"Chinese Application Serial No. 201811391595.2, Response filed Apr. 14, 2025 to Office Action mailed Dec. 18, 2024", W English Claims, 17 pgs.

"Chinese Application Serial No. 201811391595.2, Office Action mailed Jul. 15, 2025", W/ Machine English Translation, 22 pgs.

"Chinese Application Serial No. 201811391595.2, Response filed Sep. 9, 2025 to Office Action mailed Jul. 15, 2025", w English Claims, 17 pgs.

Geiger, Andreas, "The Kitti Vision Benchmark Suite-Raw Data", [Online]. Retrieved from the Internet https www.cvlibs.net datasets kitti raw_data.php, Accessed on Nov. 22, 2024, 2 pages.

Geiger, Andreas, "Vision meets robotics The KITTI dataset", The International Journal of Robotics Research 3211 1231-1237, Aug. 23, 2013, 7 pages.

\* cited by examiner

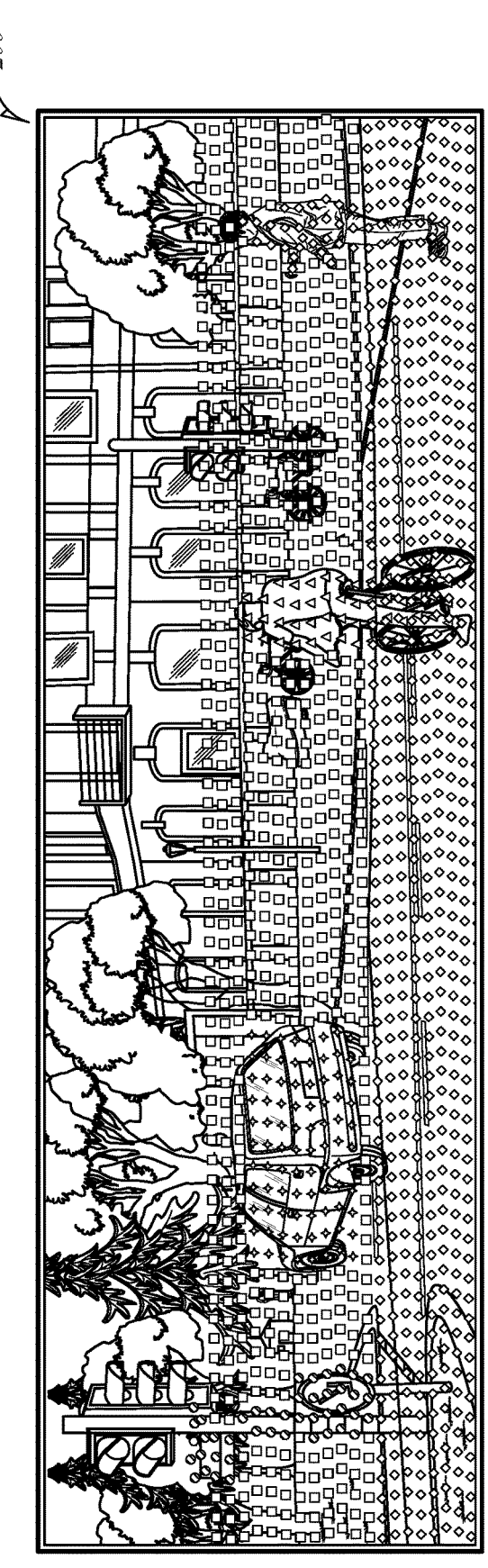
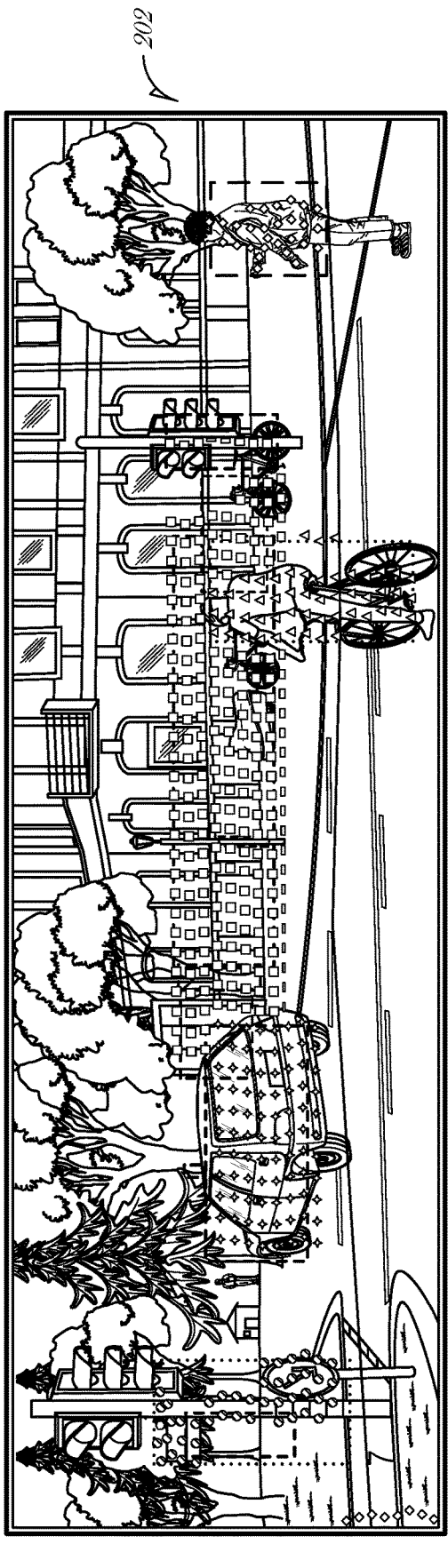
*FIG. 2*

3D POINT CLOUD BEFORE FILTERING

FILTERING REDUCED DATA TO 5.07%
ZOOMED OUT

FILTERING REDUCED DATA TO 5.07%
RESCALED

SEGMENTS IN 3D DATA

Figure 6:
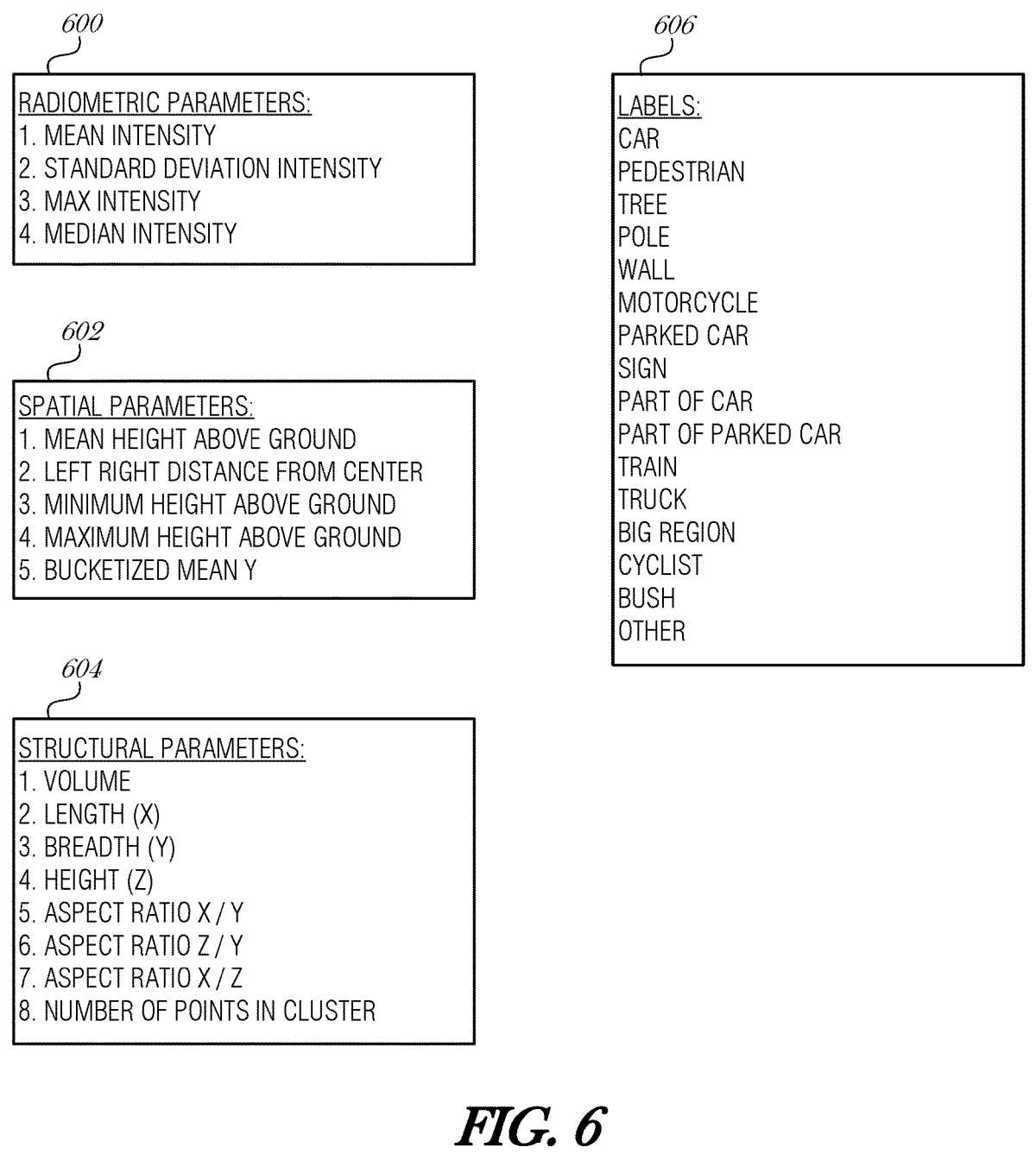

*600*

RADIOMETRIC PARAMETERS:
1. MEAN INTENSITY
2. STANDARD DEVIATION INTENSITY
3. MAX INTENSITY
4. MEDIAN INTENSITY

*602*

SPATIAL PARAMETERS:
1. MEAN HEIGHT ABOVE GROUND
2. LEFT RIGHT DISTANCE FROM CENTER
3. MINIMUM HEIGHT ABOVE GROUND
4. MAXIMUM HEIGHT ABOVE GROUND
5. BUCKETIZED MEAN Y

*604*

STRUCTURAL PARAMETERS:
1. VOLUME
2. LENGTH (X)
3. BREADTH (Y)
4. HEIGHT (Z)
5. ASPECT RATIO X / Y
6. ASPECT RATIO Z / Y
7. ASPECT RATIO X / Z
8. NUMBER OF POINTS IN CLUSTER

*606*

LABELS:
CAR
PEDESTRIAN
TREE
POLE
WALL
MOTORCYCLE
PARKED CAR
SIGN
PART OF CAR
PART OF PARKED CAR
TRAIN
TRUCK
BIG REGION
CYCLIST
BUSH
OTHER

OBTAIN SEGMENTED DATA OF A FIRST AND
SECOND LIDAR FRAME

*804*

DETERMINE, FOR A GIVEN SEGMENT IN THE FIRST
LIDAR FRAME, A SIMILAR SEGMENT IN THE
SECOND LIDAR FRAME

*806*

ASSIGN AN OBJECT ID OF THE GIVEN SEGMENT TO
THE SIMILAR SEGMENT

*808*

TRACK THE SIMILAR SEGMENT FROM THE FIRST
LIDAR FRAME TO THE SECOND LIDAR FRAME

LiDAR-BASED OBJECT TRACKING

CLAIM OF PRIORITY

This patent application is a U.S. National Stage Application under 35 U.S.C. 371 from International Application No. PCT/US2022/021178, filed Mar. 21, 2022, published as WO 2023/009180, which claims the benefit of priority U.S. Provisional Patent Application Ser. No. 63/226,861, entitled "LiDAR-based Object Tracking," filed on Jul. 29, 2021, all of which are hereby incorporated by reference herein in their entirety.

TECHNICAL FIELD

Embodiments described herein generally relate to object detection systems, and in particular, to light detection and ranging-based object tracking.

BACKGROUND

In the automotive context, advanced driver assistance systems (ADAS) are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle. ADAS relies on various sensors that are able to detect objects. Examples of such sensors include visible light cameras, radar, laser scanners (e.g., LiDAR), acoustic (e.g., sonar), and the like.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 illustrates a filtering data pre-processing operation, according to an example;

FIG. 6 is an illustration of features and labels used in a supervised learning model, according to an example;

DETAILED DESCRIPTION

Figure 1:
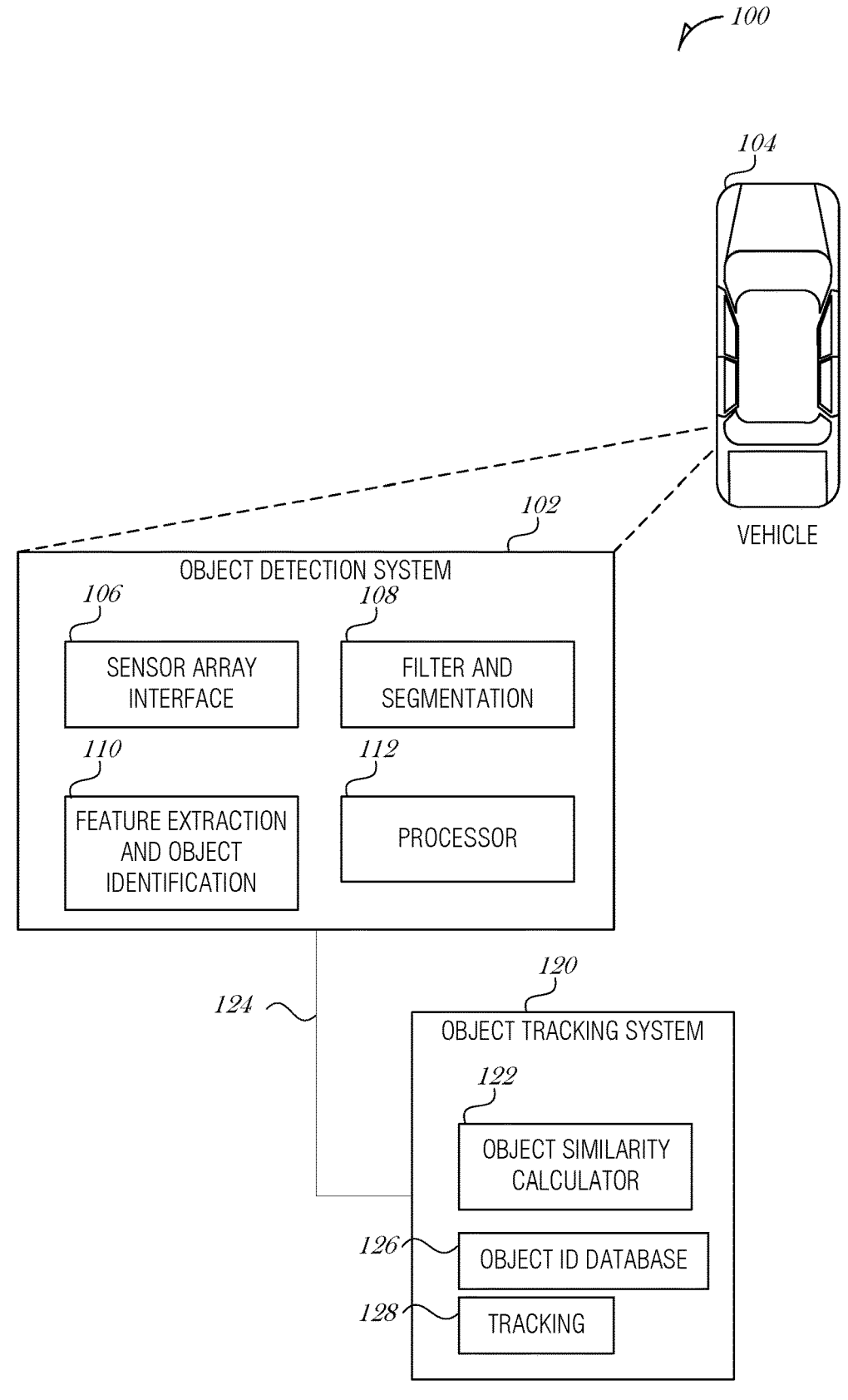
FIG. 1 is a schematic drawing illustrating a system to process LiDAR data to provide improved object detection, according to an example.

In the following description, for purposes of explanation, numerous specific details are set forth in order to provide a thorough understanding of some example embodiments. It will be evident, however, to one skilled in the art that the present disclosure may be practiced without these specific details.

Vehicles may include various forward, sideward, and rearward facing sensors. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

Autonomous vehicles (AVs) may be partially or fully autonomous and may operate in a partial or full autonomous mode for some or all of the time. Partial autonomous mode may provide various collision avoidance, driver alert systems, lane change warnings, and the like. In contrast, full autonomous mode may relieve the driver from nearly all operational aspects. Modes may be changed during a driving session. For instance, a driver may operate an AV in partial autonomous mode while in the city, and then initiate full autonomous operation after reaching a stretch of highway.

Autonomous driving and advanced driver assistance systems (ADAS) may rely on signals from a diverse set of sensors including camera, LiDAR, radar, global positioning systems (GPS), and an inertial measurement unit (IMU). The signals are used to perform two primary tasks: simultaneous localization and mapping (SLAM), which generates a map of the environment around a vehicle while simultaneously localizing the vehicle within the map; and detection and tracking of moving objects (DATMO) around the vehicle and the prediction of these objects' future behavior.

LiDAR is a surveying method that measures distance to a target by illuminating that target with a pulsed laser light and measuring the reflected pulses with a sensor. Differences in laser return times and wavelengths are used to make digital 3D-representations of the target. LiDAR is popularly used to make high-resolution maps, with applications in geodesy, geomatics, archaeology, geography, geology, geomorphology, seismology, forestry, atmospheric physics, laser guidance, airborne laser swath mapping, and laser altimetry. The technology is also used for control and navigation for AVs.

Object identification is an integral part of in-vehicle navigation systems of AVs. Traditionally, only image data is used for identifying objects such as pedestrians, vehicles, road signs, trees, poles, cyclist, walls, and other objects that are encountered by an AV on the road. However, this process is highly compute intensive as generally a pre-learned model scans the entire image frame to detect and identify objects of interest. This complex processing not only requires high-performance computers inside the vehicle to complete the object identification task, but it must also complete the object identification task within the required response time, from perception to actuation, to safely handle actual hazards on the road. Additionally, Image-based object identification also suffers from problems related to illumination (shadows, glares, nighttime, etc.) and occlusion as the depth information is not captured. As a result, LiDAR-based object detection is often used, optionally, in addition to image-based object identification approaches. Progressing from object detection and identification is object tracking. Object tracking is a very basic requirements for robots, drones, and autonomous vehicles.

Most types of object tracking systems use video data input. Two main categories of tracking algorithms are (1)

kernel-based tracking, which is an iterative localization procedure based on maximization of a similarity measure, and (2) contour-based tracking. Both are iterative in nature and suffer from cumulative errors due to the fact that object detection cannot be performed for every video frame.

Because image-based object detection is a compute intensive process, many image-based object tracking schemes are implemented by performing object detection on a specific frame and then using prediction methods (such Kalman filtering) based on the speed and the direction of the object to track the location of the object in subsequent frames. This leads to prediction errors which grow cumulatively with time.

Further, 3D object tracking is difficult with video input, since video data lacks accurate range information. Range estimated by algorithms such as structure-from-motion is computationally intensive and often only viable by offline processing. There is no LiDAR-based solution for object tracking.

In contrast, the present disclosure describes LiDAR-based object tracking. This solves the problems of image-based object tracking by using a very efficient object detection algorithm that is capable of detecting objects in every frame and a feature-based matching method to track the objects one frame to another. Although the object detection algorithm described here is capable of being executed on every frame, it is not required to do so and may be executed on every other frame, for instance, to reduce computational overhead. By performing the object detection more often, e.g., every frame, LiDAR-based object tracking avoid problems with prediction errors or cumulative drifts caused by having to predict an object's movement from frame to frame.

Additionally, the present system is LiDAR-based in both 3D and 2D, and matches objects from one frame to another based on a set of cluster features. 2D LiDAR systems typically use a single light source (e.g., laser beam) and spins around a fixed axis. This produces reflections on a single plane. 2D sensors are suitable for performing detection and ranging tasks. 3D LiDAR provides multiple light sources spread out on a vertical axis are simultaneously rotated. This provides returns that have an x, y, and z component. 3D LiDAR may be used for terrestrial scanning and mapping.

As a result of the frame-to-frame object matching, there is no requirement for the use of compute-intensive machine learning models, thus making the detection and tracking process highly compute efficient. This tracking may be performed quickly, such as at 10 Hz, or every 0.1 seconds on a time scale. Also, because object detection is done by a LiDAR point cloud clustering method, without any pre-trained model (trained to detect only specific objects), object detection and tracking accuracies are higher, as it would detect any object in its field of view.

Consequently, several advantages are recognized as a result of the present LiDAR-based object tracking systems and methods. These include 1) an increase in accuracy, 2) computational efficiency, 3) hardware simplicity, 4) versatility, and 5) adaptivity.

Because objects are detected in every scan, cumulative error is avoided, and accuracy is improved. LiDAR-based object detection is less computationally intensive than image-based techniques. As a result, LiDAR-based object tracking can be processed in real time on mobile platforms. In an example, the present system uses only LiDAR. In such an example, there is no camera or sensor fusion needed, resulting in less costly systems to develop and deploy. Other examples may include camera or other sensor fusion along with LiDAR in order for redundancy, handling certain environmental conditions, or the like.

Additionally, not only objects can be tracked, but a stationary 3D map can also be created. For instance, objects can be tracked relative to stationary coordinate, and this enables information sharing between autonomous agents (e.g., vehicles, robots, drones, etc.) which are at different locations and moving at different velocities. Consequently, the present systems and methods can be used for tracking, map building, speed detection and enforcement, and collaboration.

Further, the LiDAR clusters features and their combination can be user configurable or automatically selected based on a machine learning method, for different environmental setting such as indoor operation versus outdoor, robot versus autonomous vehicle, 3D LiDAR versus 2D LiDAR, etc.

The improved sensor system described herein realizes technical improvements in object tracking using LiDAR data. The LiDAR-based sensor system also provides advantages over visible light camera systems in that LiDAR is useful to detect and identify objects under different illumination conditions and also at different distances from the ego vehicle regardless of ambient light conditions. Thus, the sensor system described here provides a multi-object tracking mechanism based on LiDAR-based features. The disclosed systems and methods provide a multi-object tracking technique based on an adaptive clustering and efficient feature extraction, thus enabling efficient object detection and identification.

The system is based on an efficient LiDAR-based tracking technique that uses features of the LiDAR data clusters belonging to different objects. Objects are tracked from one frame to another (or one scan to another) by using an efficient feature matching method, which is also adaptive to the density of the LiDAR returns. The system computes a neighborhood radius around an object adaptively, based on the maximum distance between the object in one frame and all the objects in a successive frame. This helps in efficient neighborhood computation for different object distribution patterns.

Various examples described below contemplate the use of a LiDAR system as a practical 3D (depth) capture device. However, it should be understood that any suitable 3D capture modality, or combination of modalities, may be utilized. In general, the output from a 3D capture device, whether LiDAR or another type, includes ranging, or distance, indicia. For instance, the output may include a point cloud of measured distances within the field of view of the 3D capture device.

As such, although inventive solutions are described here within in the context of LiDAR, the same inventive solutions also apply to radar. Vehicular radar components, like LiDAR components, produce similar raw data (e.g., point clouds), and derive similar features from raw data and the environment (e.g., object identification and tracking, speed, doppler motion, etc.). So although the physical generation of raw data is different (physical LiDAR components different to physical radar components), the post-processing of raw data (e.g., point clouds) can employ substantially similar methods and processing apparatuses. In addition, it can be beneficial to switch between LiDAR and radar data acquisition and processing depending on environmental conditions (e.g., weather, signal interference, etc.), and track objects using LiDAR as well as radar data, e.g., fusing LiDAR and radar raw data like point clouds, or track objects over time using e.g., LiDAR data at a first time instance, and radar data at a second time instance (or vice versa).

FIG. 1 is a schematic drawing illustrating a system 100 to process LiDAR data to provide improved object tracking, according to an example. FIG. 1 includes an object detection system 102 incorporated into the vehicle 104. The object detection system 102 includes a sensor array interface 106, a filter and segmentation (FS) circuitry 108, a feature extraction and object identification (FEOI) circuitry 110, and a processor 112.

The object detection system 102 is coupled to or integrated with an object tracking system 120. In an example, the object detection system 102 is connected with the object tracking system 120 over an interface 124. The interface 124 may be a bus, link, data channel, fiber, interconnect, wireless communication link, shared memory, or the like. The object tracking system 120 may be on the same integrated circuit package as the object detection system 102, or on separate packages. The object tracking system 120 obtains objects that are detected by the object detection system 102 over the interface 124, along with the features of these detected objects. Using these features, the object tracking system 120 is able to track objects from scan to scan (i.e., frame to frame). This mechanism is discussed more fully below.

The vehicle 104, which may also be referred to as an "ego vehicle" or "host vehicle," may be of any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 104 may operate at some times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional controls (e.g., steering wheel or brake pedal) and non-conventional inputs (e.g., voice control or gestures).

The vehicle 104 includes a sensor array, which may include various forward, side, and rearward facing cameras, radar, LiDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a substantially opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed substantially outward from the sides of the vehicle 104. Cameras in the sensor array may include infrared or visible light cameras, able to focus at long-range or short-range with narrow or large fields of view.

The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Components of the object detection system 102 and the object tracking system 120 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In operation, the vehicle 104 obtains sensor data via the sensor array interface 106 from sensors integrated in the vehicle 104, or sensors that are able to be communicatively coupled to the vehicle 104. The sensors include at least a LiDAR system, but may also include radar, visible light cameras, acoustic sensors, environmental sensors, infrared sensors, or combinations thereof. LiDAR provides a three-dimensional (3D) point cloud of light reflections of objects around the vehicle 104.

The FS circuitry 108 provides data filtration and segmentation of the LiDAR point cloud. Filters are based on (x,y,z) coordinates of the points in the 3D LiDAR point cloud. This method of filtering is highly compute efficient and robust compared to existing methods, which use largest plane detection, difference in normal, MM-Cut algorithms based on graph theory, etc. These less-efficient existing methods also tend to use a number of user input parameters, making them vulnerable to overfitting to certain types of scenarios. In contrast, the methodology implemented by the FS circuitry 108 is more generally applicable and uses fewer user input parameters.

The FS circuitry 108 filters out ground returns based on z-value of the returns (e.g., z<−1), removes returns from the road (e.g., 10>y>−8), and those returns from behind the vehicle 104 (e.g., x<4). The coordinate planes are arranged such that the vehicle 104 is at coordinate (0,0,0) and arranged on the x-axis longitudinally. The y-axis is from left of the host vehicle's perspective (positive y values) to right of the host vehicle's perspective (negative y values), and the z-axis is from below the horizon (negative z values) to above the horizon (positive z values). The horizon may be set at the vertical centerline of a field of view of the LiDAR sensor. It is understood that the horizon may be adjusted based on different implementations. Moving the horizon may require changing threshold cutoff values for the filtering operation.

By performing the coordinate-based filtering, the FS circuitry 108 is able to reduce nearly 90% of the input data (e.g., point cloud data). FIG. 2 illustrates a filtering data pre-processing operation, according to an example. Scene 200 illustrates all LiDAR return data in the direction of travel superimposed on an image frame. Scene 202 illustrates filtered LiDAR data superimposed on the image frame. The filtered LiDAR data removes ground return and data from off the sides of the road.

Figure 3:
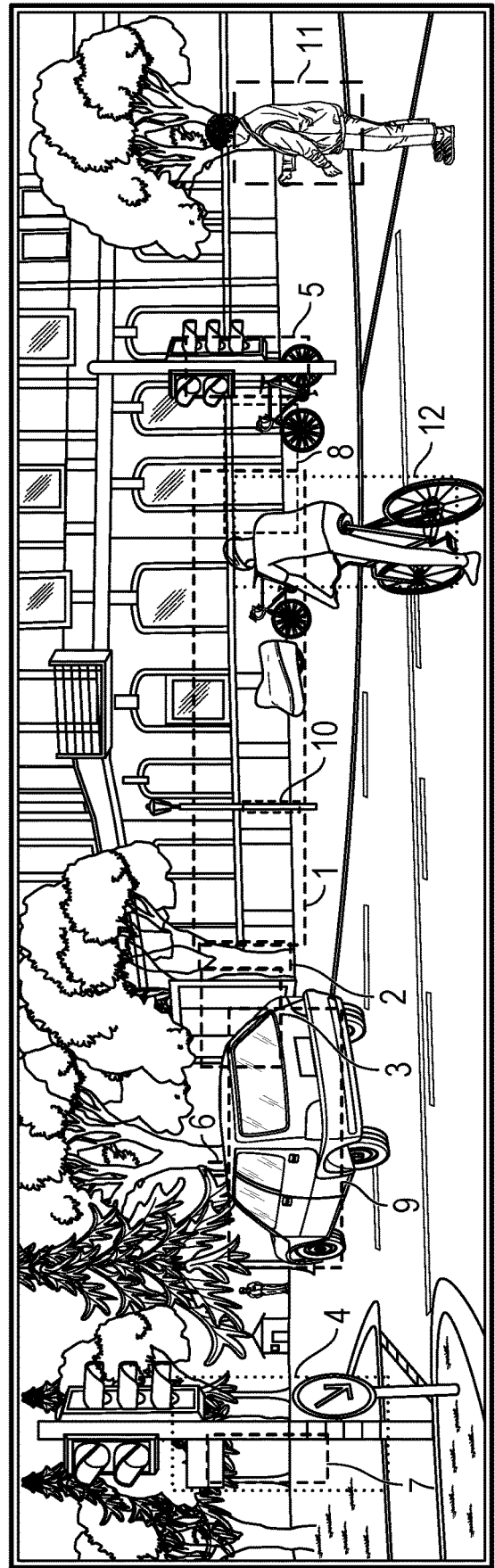
FIG. 3 illustrates an example scene of segmented image data, according to an example.

Returning to FIG. 1, after filtering, the FS circuitry 108 performs segmentation on the filtered data using an adaptive segmentation algorithm. The adaptive segmentation algorithm identifies clusters of point cloud data using computed parameters, which are adaptive to distance from the vehicle 104. The 3D coordinates are obtained by segmenting point cloud data in LiDAR space. The 2D coordinates are obtained by using a transformation matrix, precomputed to generate corresponding 2D coordinates for each point in 3D space. The 2D boxes are then superimposed on to the image frame. The image frames are not used for generating the corresponding 2D boxes. FIG. 3 illustrates an example scene of segmented image data. In FIG. 3, 2D boxes are overlaid on detected objects.

Segmentation is performed on the point cloud as part of the signal processing to detect the presence of objects. According to some examples, as will be described in greater detail below, segmentation operations identify clusters in point cloud data corresponding to different objects in the field of view of the 3D capture device. The clusters of points represent detectable objects.

According to some aspects of the examples, parameters of the segmentation algorithm are dynamically adjusted in response to the point-cloud density function. Some examples adjust the segmentation algorithm parameters per candidate segment based primarily on the measured range to each candidate segment. Accordingly, for a given field of view, the various objects therein may be processed with differing segmentation algorithm parameter values.

In a related example, candidate segments at the same or similar range are processed with the same segmentation parameter values. Similarity of range may be defined based on certain similarity criteria, such as falling within a common band of ranges, for instance.

In related aspects of the examples, the parameters of the segmentation algorithm are further adjusted in response to a prevailing environmental condition that variously affects the point cloud distribution at different distances.

Various algorithms are contemplated for use in performing the segmentation operations. In various examples, one or more clustering algorithms are used. In related examples, one or more classification algorithms are used. In related examples, one or more machine learning algorithms are used. One or more of these types of algorithms may themselves be combined with one or more algorithms of other types. Each algorithm has its specific parameters that are subject to adjustment according to aspects of the examples. Various examples are provided in greater detail below, but it should be recognized that principles of the present subject matter are just as applicable to other segmentation algorithms and their corresponding variable parameters, whether known or arising in the future, that are not specifically mentioned in the present description.

A signal-processing and computing platform according to various examples may comprise a computing architecture suitable for carrying out its operations. In various applications, size, weight, and cost constraints are balanced against the computational performance called for to carry out those operations. As detailed more fully below, a number of practical realizations are contemplated, and the scope of the claimed subject matter should not be limited to any particular example described herein, unless expressly called out in in a corresponding claim. Portions of the signal-processing and computing platform may be implemented with specially-fabricated electronics in one or more very large-scale integrated (VLSI) circuits, with one or more field-programmable gate arrays (FPGAs), with a processor-based system that executes instructions, or with some combination of these types of devices.

Notably, FS circuitry 108 is configured to apply different segmentation algorithm parameter values to different portions of the spatial data based on the measured ranging values of those portions of the spatial data. The portions of spatial data to which the segmentation algorithm with variable parameter values is applied may be points of a point cloud.

An adaptive density-based technique is described here. For example, in the case of a density-based spatial clustering of applications with noise (DBSCAN) algorithm being used as the segmentation algorithm, the variable parameters may be the minimum number of points (typically represented as k, or MinPts) that should be present within a neighborhood of points, and radius of the neighborhood (typically represented as $E_{ps}$).

One or more parameters that affect the sensitivity or selectivity of the segmentation algorithm are adjusted specifically for each of a plurality of ranges at which the 3D spatial data indicates a potential presence of one or more objects. At each range, or band of ranges in the 3D spatial data, common parameter value(s) may be utilized.

The range-based adjustment function may be represented as an algebraic function with range being an independent variable thereof, as one example. In another example, range-based adjustment function may be represented as a lookup table or other suitable data structure. In an example, a range-based adjustment function for parameter k of a DBSCAN algorithm may take the form of a second-order polynomial as follows:

$$k=ax^2+bx+c, \tag{EQ1}$$

with coefficient values as a=0.000151, b=−0.03354, and c=3.469367, where x is the range in meters. The parameter $E_{ps}$ may then be computed as the minimum radius in the n-dimensional hypersphere that contains k points, if the data were uniformly distributed.

Figure 4A:
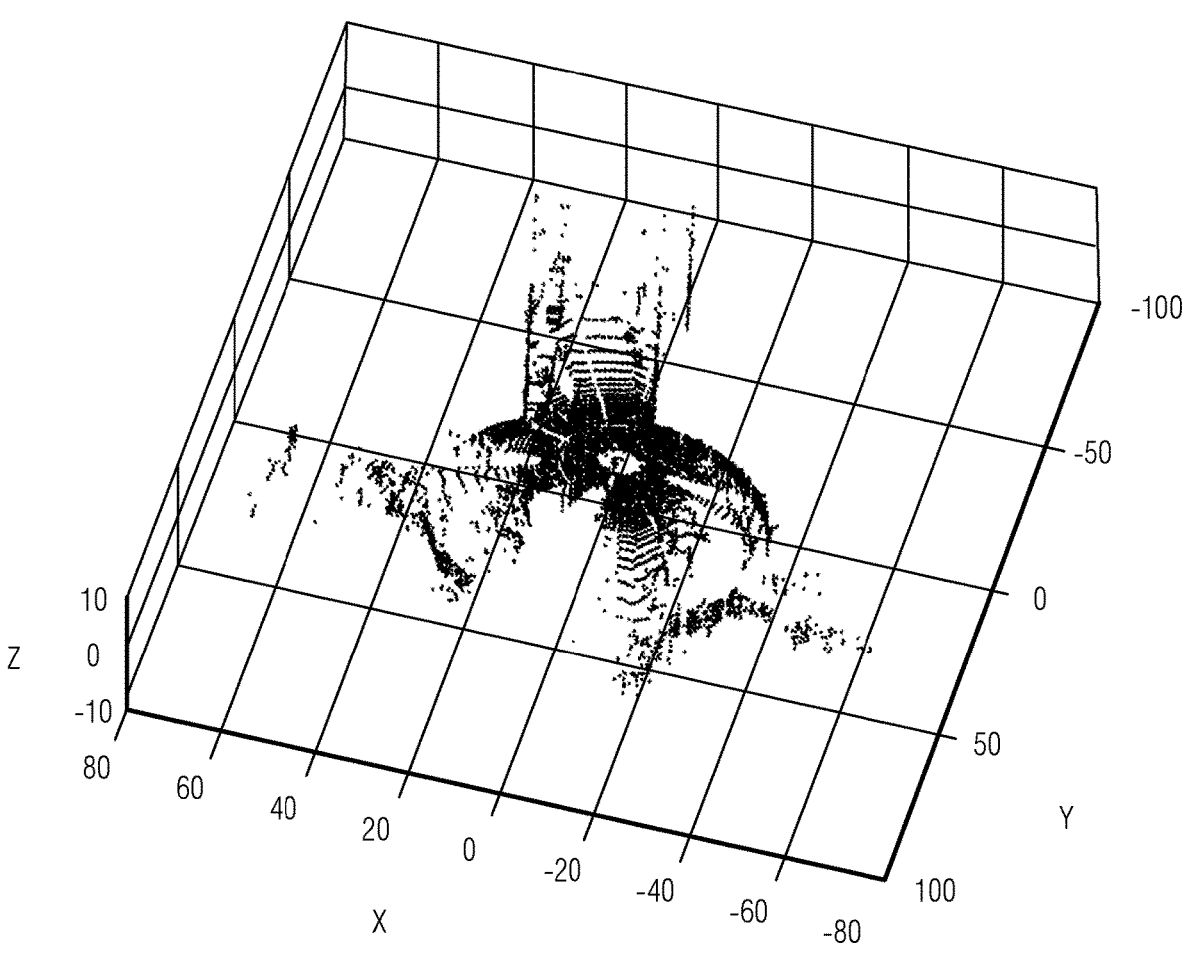
FIGS. 4A-4D illustrate a filtering data pre-processing operation, according to an example.

FIGS. 4A-4D illustrate a filtering data pre-processing operation, according to an example. FIG. 4A is an illustration of a 3D point cloud before filtering operations. The 3D point cloud may be returns from a single scan (e.g., frame). The host vehicle is at the center of the coordinate (0,0,0) and the points in the 3D point cloud are based on return data from the LiDAR scan.

Figure 4B:
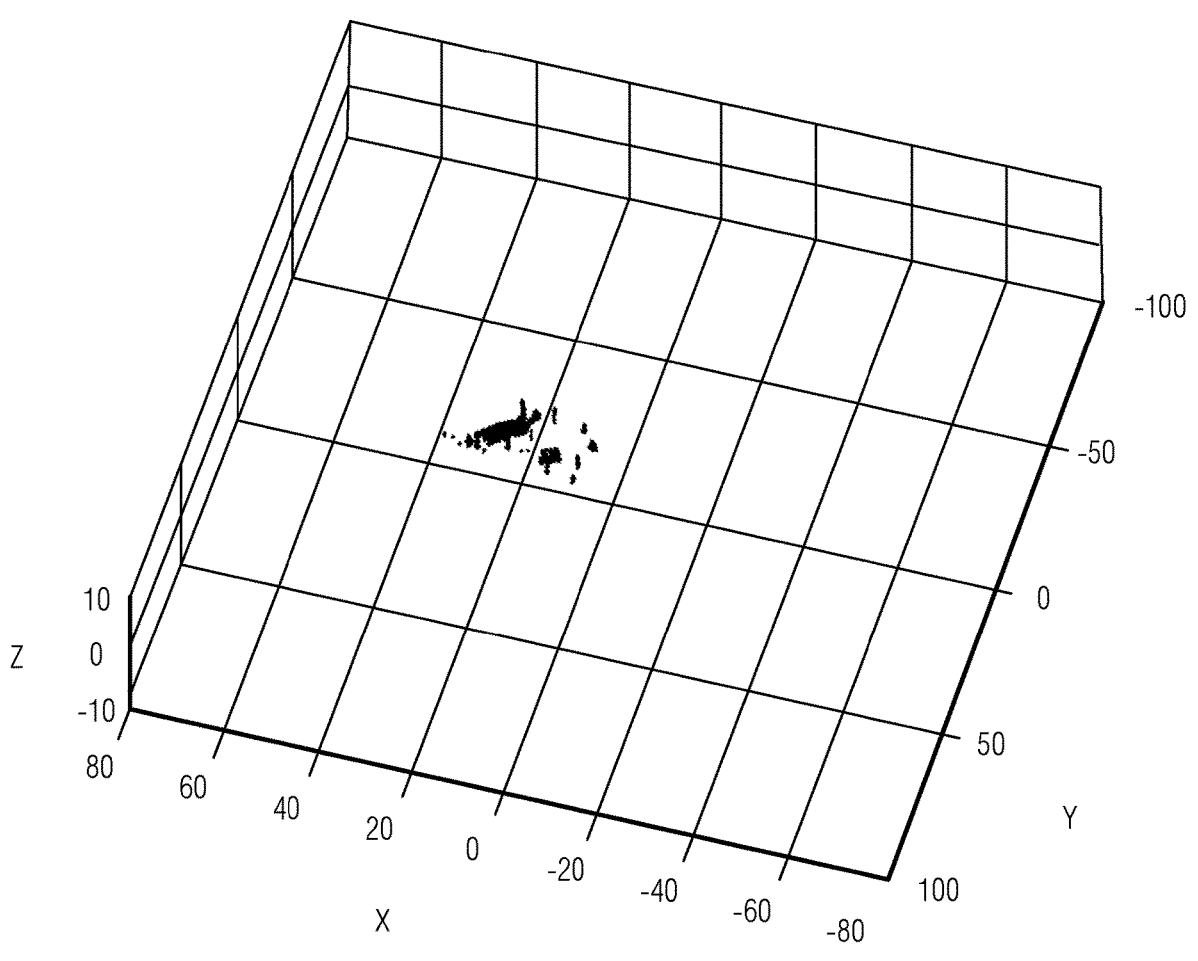
Figure 4C:
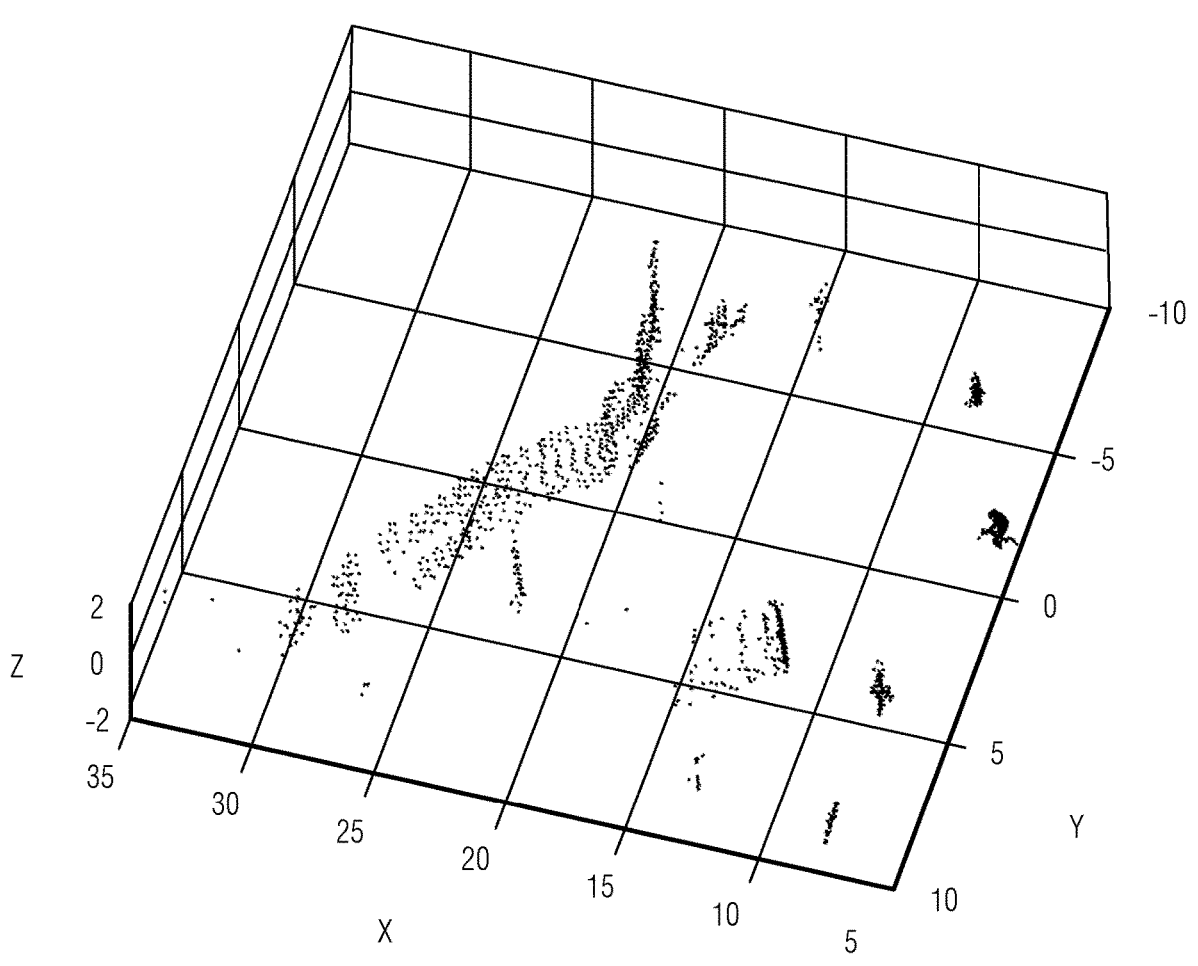

FIG. 4B illustrates the 3D point cloud after filtering. The filters used in this example may remove ground returns (e.g., returns that are from the road surface or surrounding ground surfaces), point cloud data of segments or objects that are off the side of the road, point cloud data of segments or objects that are above or below z-axis thresholds, and the like. In the example illustrated in FIG. 4B, the 3D point cloud data is reduced to 5.07% of the original data. This reduces the computational requirements for object identification, object tracking, or other processing of the point cloud data. FIG. 4C is a rescaled representation of FIG. 4B.

Figure 4D:
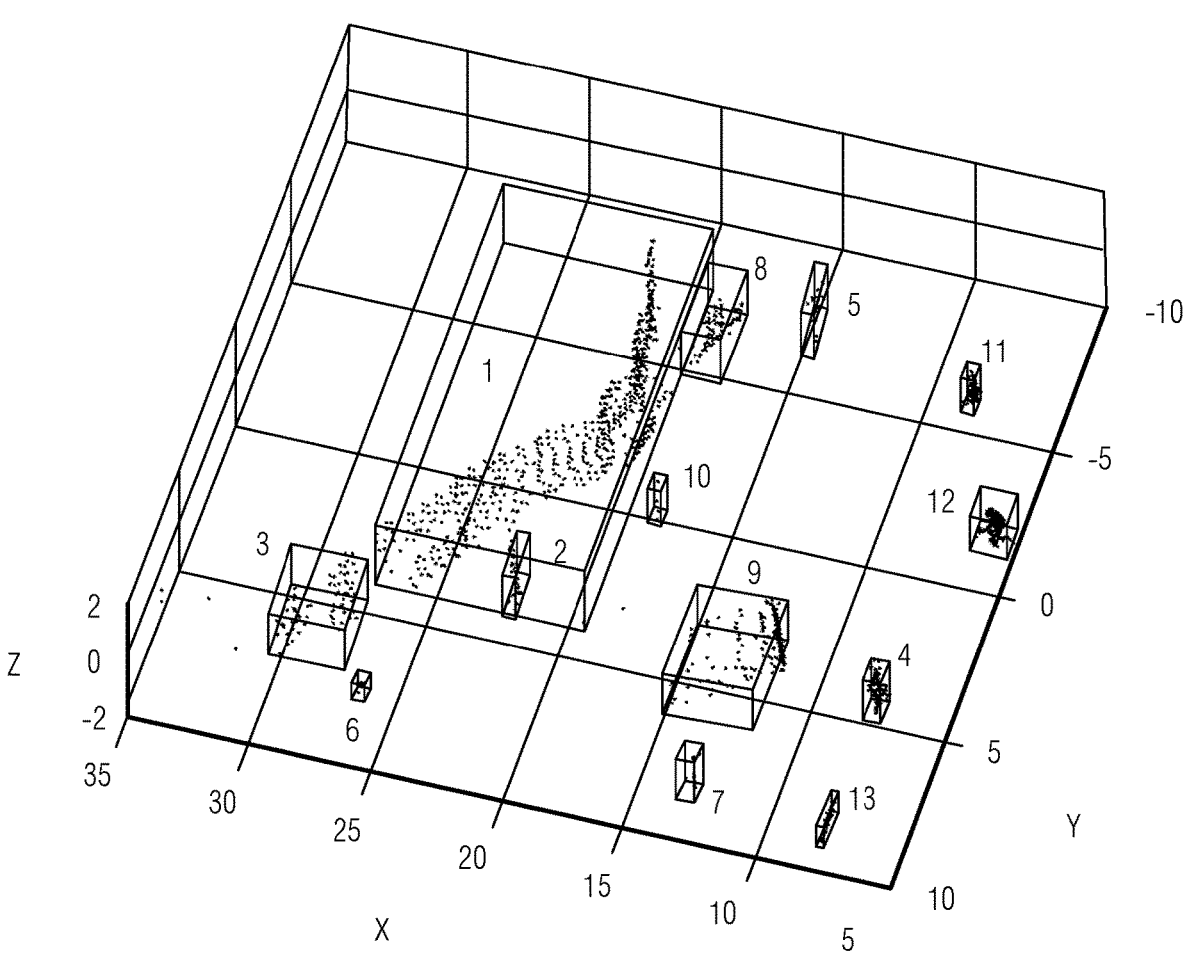

FIG. 4D is a scaled and truncated view of the 3D point cloud. In particular, the view in FIG. 4D is that of the forward arc of host vehicle or LiDAR sensor. In FIG. 4D, the 3D point clouds are segmented into volumetric shapes. The volumetric shapes include eight points that denote the outer boundaries in the x, y, and z axis of the object. Using the points of the volumetric shapes, the system is able to derive the estimated height, width, and depth of the shape in the coordinate space. Additionally, the segmented volumetric shapes are localized to the vehicle where the vehicle is understood to be at point (0,0,0).

Returning to FIG. 1, the FS circuitry 108 may further filter segments based on their z value (e.g., location above or below the horizon), height (e.g., the difference of max-z minus min-z), the volume of the segment, or combinations thereof. The z value of an object (segment) is observed with a minimum z (e.g., the lowest z value of the object) and a maximum z (e.g., the highest z value of the object). The difference between the min-z and max-z is the height.

In various examples, the FS circuitry 108 may remove very high or insignificant segments with a minimum z threshold and a minimum volume threshold, for example, to filter out detected objects that are high in the horizon and also have low volume. The FS circuitry 108 uses the minimum z threshold and evaluates the object's min-z value, and if it is sufficiently high above the horizon (e.g., above some relatively large positive z-value), then the object is considered "very high" and may be filtered out, especially when it also has a low volume.

The FS circuitry 108 may remove segments that are just thin horizontal slices using a minimum height threshold. If the height, as measured by looking at the min-z and max-z values of a given segment, is less than a relatively small z-value that represents the minimum height threshold, then the segment may be filtered out.

Additionally, the FS circuitry 108 may remove low lying or insignificant segments using a maximum z threshold and a minimum volume threshold. If the max-z value (e.g., the top corner of an object) is under the horizon (e.g., at some negative z-value), then the object is considered low lying. If it is also low volume, then it may be filtered.

Figure 5:
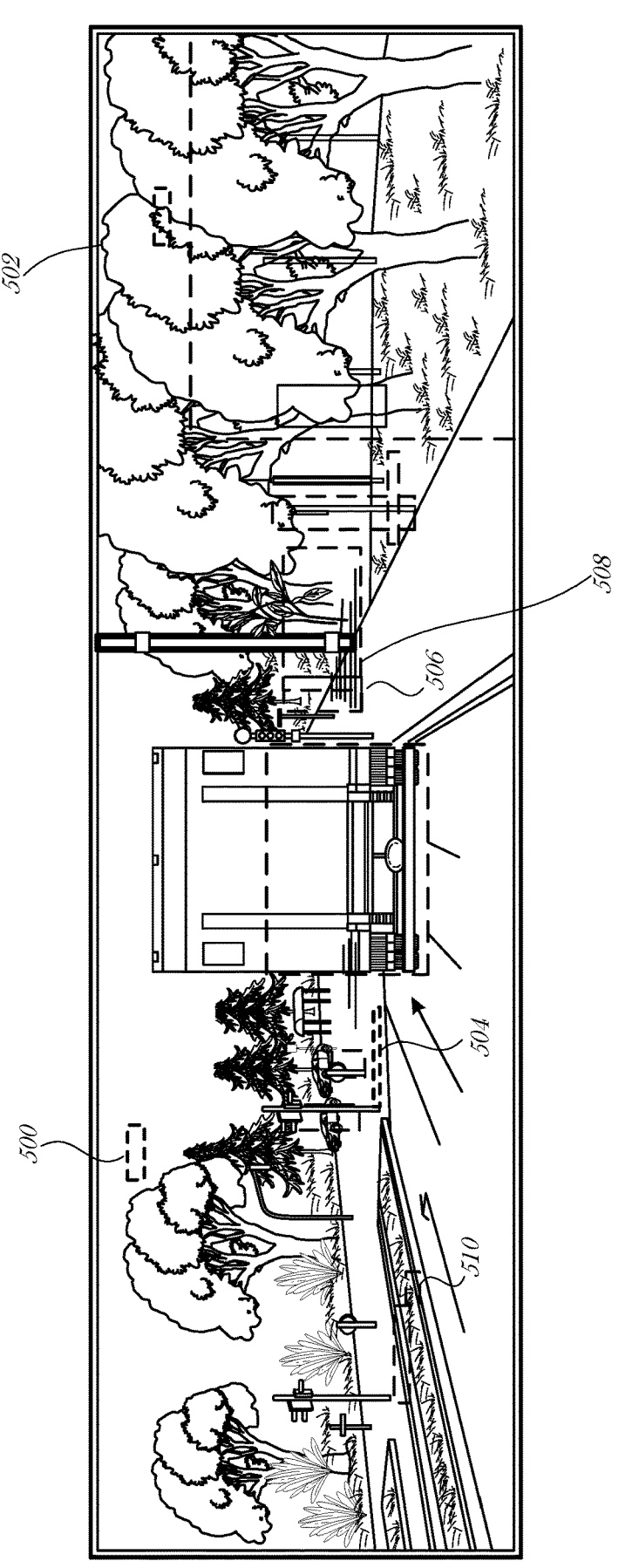
FIG. 5 illustrates an example scene, according to an example.

FIG. 5 illustrates an example scene, according to an example. In FIG. 5, several segments are identified as being high and insignificant when compared to threshold values (e.g., segments 500 and 502), several segments are identified as being sufficiently thin when compared to a threshold value (e.g., segments 504, 506, and 508), and some segments are identified as being low lying and insignificant when compared to threshold values (e.g., segment 510).

Returning to FIG. 1, the FEOI circuitry 110 extracts a number of features from the filtered segmented data that was produced by the FS circuitry 108. The features are categorized as radiometric, spatial, and structural features.

In experiments with a large number of images and LiDAR data, it was observed that very simple features extracted from point cloud LiDAR data are highly discriminative across different objects. Aspect ratios between x, y, and z of 3D segments of LiDAR data, volumes of the LiDAR data segments, and location of the segments in the LiDAR frame were very indicative of the object type. Using the radiometric, spatial, and structural features, the FEOI circuitry 110 is able to identify average feature values and produce labeled segments from the LiDAR data and other input data. This is described in more detail in the discussion of FIG. 6 below.

Several technical improvements result from the LiDAR-based implementation discussed here. The LiDAR-based implementation reduces the information investigation to radiometric parameters, spatial parameters, and structural parameters. As such, this implementation does not require analyzing motion parameters of objects in a scene. Analyzing motion requires analysis of multiple image frames. Using multiple image frames for motion parameter analysis requires additional time. For instance, if the sampling time (e.g., rotations of LiDAR sensor) is 10 Hz, then it may take up to one second to obtain enough motion data to perform classification in some disadvantageous implementations. In contrast, the LiDAR-based implementation discussed here only requires one image frame (i.e., scan).

When motion data is used, then multiple frames are required and occlusion may be an issue. For instance, when the object being tracked is occluded for one or more frames, the additional frames may be needed to obtain the motion data necessary to perform object classification. In contrast, the LiDAR-based implementation discussed here only requires one frame. So if the object is occluded in a frame, then in the next captured frame, the object may be detected. Compute and storage overhead due to occlusion is minimized.

Additionally, motion-based object tracking and classification methods may not be able to track stationary objects. In contrast, the systems and methods described here are able to track stationary objects, such as trees, poles, walls, signs, etc.

Another advantage of the disclosed system is that it is able to classify objects with as little as two or three points in a segment. This is due to the types of features used in the machine learning algorithm. These segments are classified as others or noise, unless the radiometric values (intensity) are significant.

The FS circuitry 108 and FEOI circuitry 110 may be implemented using special-purpose hardware, application specific integrated circuits (ASIC), field programmable gate arrays (FPGA), Hadoop clusters, or the like. FS circuitry 108 or FEOI circuitry 110 may be implemented in software and executed on the processor 112.

The object tracking system 120 includes an object similarity calculator circuitry 122. The object similarity calculator circuitry 122 may be implemented as configurable hardware, such as an ASIC, FPGA, or the like. Alternatively, the object similarity calculator circuitry 122 may be implemented in software and executed on the processor 112. The object similarity calculator circuitry 122 takes objects that are detected in multiple LiDAR frames as input. The object similarity calculator circuitry 122 computes similarity between an object in a first frame to all objects within the neighborhood in a successive frame. Objects with the maximum similarity are assigned the same Object ID from frame-to-frame. This method is repeated between every successive frame to detect and track objects from one frame to another.

Object IDs are stored in an object identification database 126. Object IDs may be associated with a feature vector in the object identification database 126. The tracking circuitry 128 may be used to calculate the location of an object (segment) in each frame. The location may be stored as an absolute position in the real world or a relative position (e.g., relative to the host vehicle). The location of an object may be stored in the object identification database 126 or in other storage accessible to the tracking circuitry 128.

To reduce computation, the object similarity calculator circuitry 122 uses a neighborhood radius for each object when comparing to possible clusters in successive frames to track the object. In an example, the neighborhood radius for an object is measured based on the maximum distance of an object cluster from all other cluster centers in the next frame. In a further example, the neighborhood distance is set to 25% of the maximum distance between a given object cluster and the cluster farthest from the given cluster. The distance may be measured from the border, the center, or the centroid of the given cluster to the border, the center, or the centroid of the other clusters.

Similarity is computed based on the comparison of one or more features. Features are described further in reference to FIG. 6, below. A similarity function may be used to compare two objects. The similarity function may be a weighted function that aggregates two or more features to determine a similarity index. For instance, the object clusters are identified and then a set of features related to the intensity values, shape of the LiDAR cluster, and position of the cluster, are extracted. Some objects of no interest may be filtered out using feature-based filters (e.g., very large objects such as walls, objects that are very high from the ground, which may be flying objects, etc.). The remaining objects are tracked across frames.

A feature vector may be constructed for each object. The feature vector is a list of measurements that are arranged as an ordered list. For instance, the feature vector for an object may include the attributes [width, height, depth, volume]. Other features may be included in the feature vector, such as the radiometric parameters 600, spatial parameters 602, and structural parameters 604, illustrated in FIG. 6. In an example, the similarity function to match clusters from one frame to another is based on cosine similarity. Cosine similarity is used to measure similarity between feature vectors. For example, in data analysis, cosine similarity is a measure of similarity between two sequences of numbers (i.e., two feature vectors). Other similarity functions may be used.

While some examples are discussed in the context of a vehicle, it is understood that other machines may implement LiDAR-based object detection, such as drones, robots, security systems, and the like. As such, the systems and methods disclosed herein are not limited to vehicle applications.

FIG. 6 is an illustration of features and labels used in a supervised learning model, according to an example. Point cloud features, such as those illustrated as radiometric parameters 600, spatial parameters 602, and structural parameters 604, are extracted from segmented or clustered point cloud data. The features are used as input to a supervised learning model. Additionally, the features may be used to compare segments or clusters between scans or image frames, as discussed in FIGS. 7 and 8, below.

In an example, the supervised learning model is a support vector machine (SVM) machine learning model that uses radiometric parameters 600, spatial parameters 602, and structural parameters 604. The SVM may be trained to label segments with labels 606. The labels 606 illustrated in FIG. 6 are non-limiting.

Radiometric parameters 600 refer to the LiDAR returns and the intensity of the return signal. Mean intensity values, standard deviation intensity values, maximum intensity values, and median intensity values are computed for each segment of interest. Additional or different intensity features may be used without departing from the scope of this document. Intensity may be discriminative across certain types of objects (e.g., metal objects versus trees).

Spatial parameters 602 refer to the object's location in 3D space. Some spatial parameters that may be computed include mean height above the ground plane, left or right distance from the center line, minimum height above the ground plane, or maximum height above the ground plane. Additional or different spatial features may be used without departing from the scope of this document. The location of the segment of interest is discriminative and may be used to filter out noise or unclassified objects. Examples of spatial-based discrimination include poles and road signs, which generally have a greater mean Bucketed Mean Y value as they are often along the sides of the road. Further, a relatively large minimum z value (the lower bound of the z-axis measurement of the object) may indicate that the object is uninteresting. For instance, an object where its lowest z-value is high above the horizon may indicate a "floating object," such as a traffic light where the bottom part of the traffic light occluded.

Structural parameters 604 refer to geometric aspects of the object. Structural parameters 604 include volume, length (x-axis), width (y-axis), height (z-axis), x-y aspect ratio, z-y aspect ratio, x-z aspect ratio, and the number of points in a cluster. Additional or different structural features may be used without departing from the scope of this document. Structural parameters are very discriminative and may be used to filter out unclassified objects. Examples of structural-based discrimination include poles, which have a significantly higher z-y ratio (e.g., tall and narrow) than other objects; walls, which have a significantly higher volume than most other objects.

Figure 7:
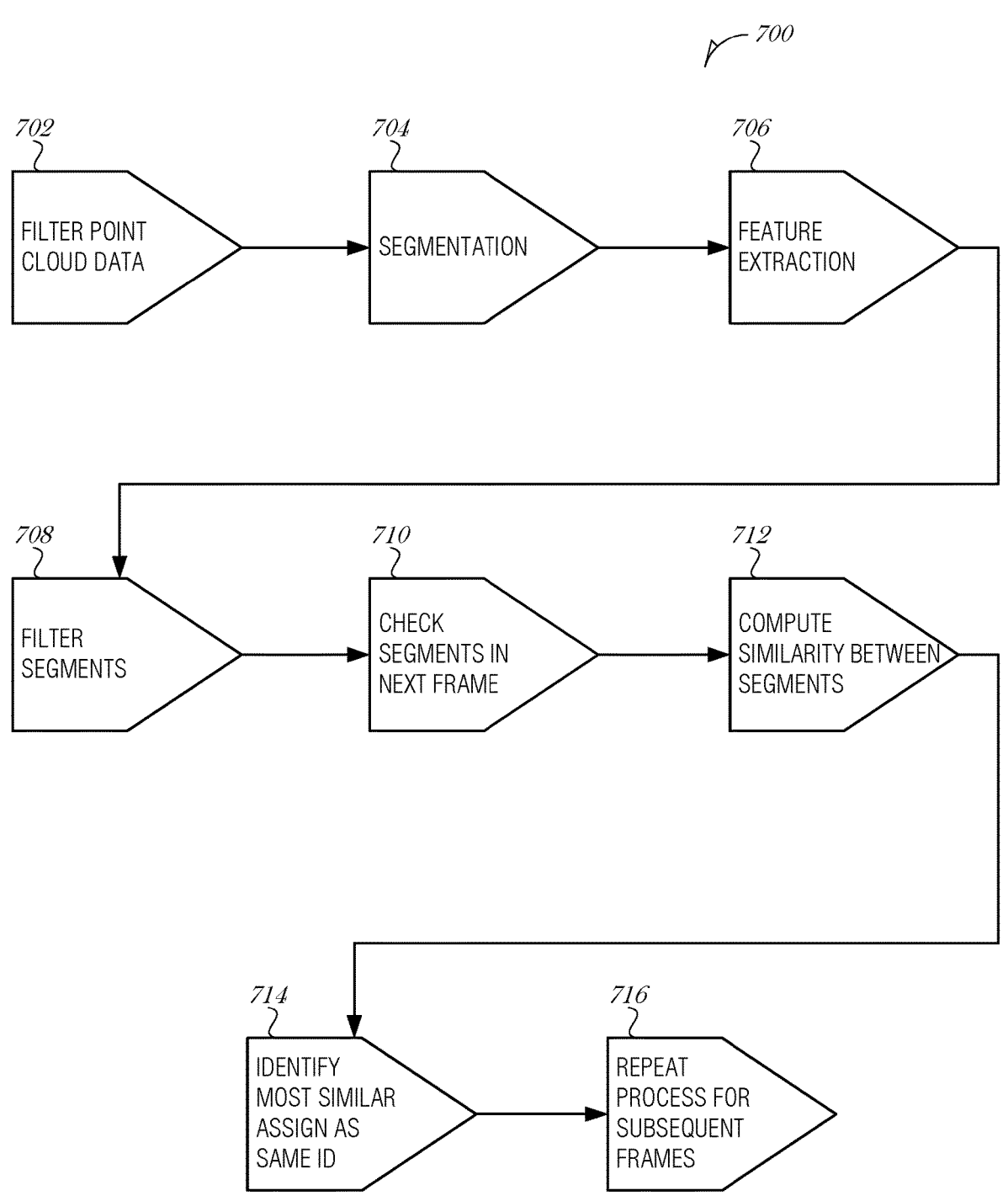
FIG. 7 is a flow diagram illustrating a LiDAR-based tracking method 700 based on point cloud feature correlation, according to an example.

FIG. 7 is a flow diagram illustrating a LiDAR-based tracking method 700 based on point cloud feature correlation, according to an example. At 702, LiDAR point cloud data is filtered to remove ground returns, returns from objects that are not on the road, objects behind the ego vehicle, etc. At 704, segmentation is performed using a density-based clustering algorithm. These segments may also be referred to as "point clouds" or "clusters." At 706, features, such as those illustrated in FIG. 6, are extracted from the LiDAR segments or point clouds. At 708, the segments are filtered based on features. This segment filtering operation further reduces noise and retains the objects of interest. At 710, a successive frame is similarly processed to identify segments (i.e., point cloud clusters). At 712, the segments of the second frame within a neighborhood of a given segment of the first frame are compared and a similarity index is computed. Each segment in a previous frame is processed to identify segments that are within the neighborhood of the segment in the successive frame. At 714, the segment most similar to the given segment is identified and assigned the same Object ID as the given segment. If no object is found with a sufficiently close similarity to the given segment, then the method 700 may mark the given segment as not having a neighbor. This could happen, for instance, when the given object is occluded in a successive frame. At 716, the similarity comparisons are repeated for every subsequent frame, which allows for accurate and specific object tracking.

Figure 8:
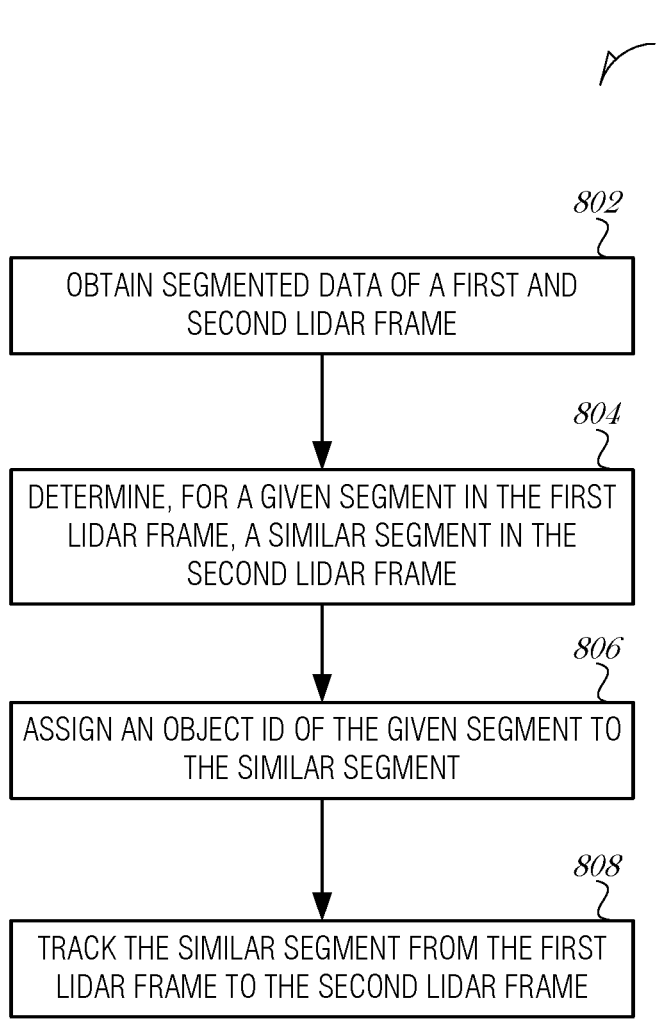
FIG. 8 is a flowchart illustrating a method for tracking objects with an object tracking system, according to an example.

FIG. 8 is a flowchart illustrating a method 800 for tracking objects with an object tracking system, according to an example. At 802, segmented data of an environment the object tracking system is operating within is obtained, where the segmented data is obtained using a light imaging detection and ranging (LiDAR) system. The segmented data includes a first plurality of segments detected in a first frame and a second plurality of segments detected in a second frame, the second frame captured after the first frame. In an example, the segmented data is produced using an adaptive density-based technique.

In an example, the segmented data is produced by a filter and segmentation circuitry of an object detection circuitry communicatively coupled to the object tracking system via an interface.

At 804, for a given segment of the first plurality of segments, a similar segment in the second plurality of segments is determined. In an example, determining the similar segment in the second plurality of segments comprises comparing features of the given segment identified in the first frame with features of the second plurality of segments identified in the second frame. This may be performed using a cosine similarity function.

In an example, the features include one or more of: radiometric parameters, spatial parameters, or structural parameters. In an example, the spatial parameters include one or more of: a mean height above ground, a minimum height above ground, or a left right distance from center. In an example, the structural parameters include one or more of: a volume, a length, a breadth, or a height of the given segment. In an example, the structural parameters include a number of LiDAR points in the given segment.

In an example, comparing features comprises calculating a similarity score. This similarity score may be the result of a cosine similarity function in the range of [0,1]. In an example, calculating the similarity score comprises using a weighted function that weights each of a plurality of features.

In an example, comparing features includes determining a set of neighboring segments to the given segment based on a neighborhood radius and comparing features of the given segment to features in the set of neighboring segments. In an example, the neighborhood radius is based on a maximum distance of the given segment from all of the second plurality of segments. In an example, the neighborhood radius is based on a percentage of the maximum distance of the given segment from all of the second plurality of segments. In an example, the percentage is 25%. In an example, the maximum distance is measured from a centroid of the given segment to a centroid of a segment in the second plurality of segments.

At 806, an object identification of the given segment is assigned to the similar segment.

At 808, the similar segment is tracked from the first frame to the second frame based on the object identification.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 9:
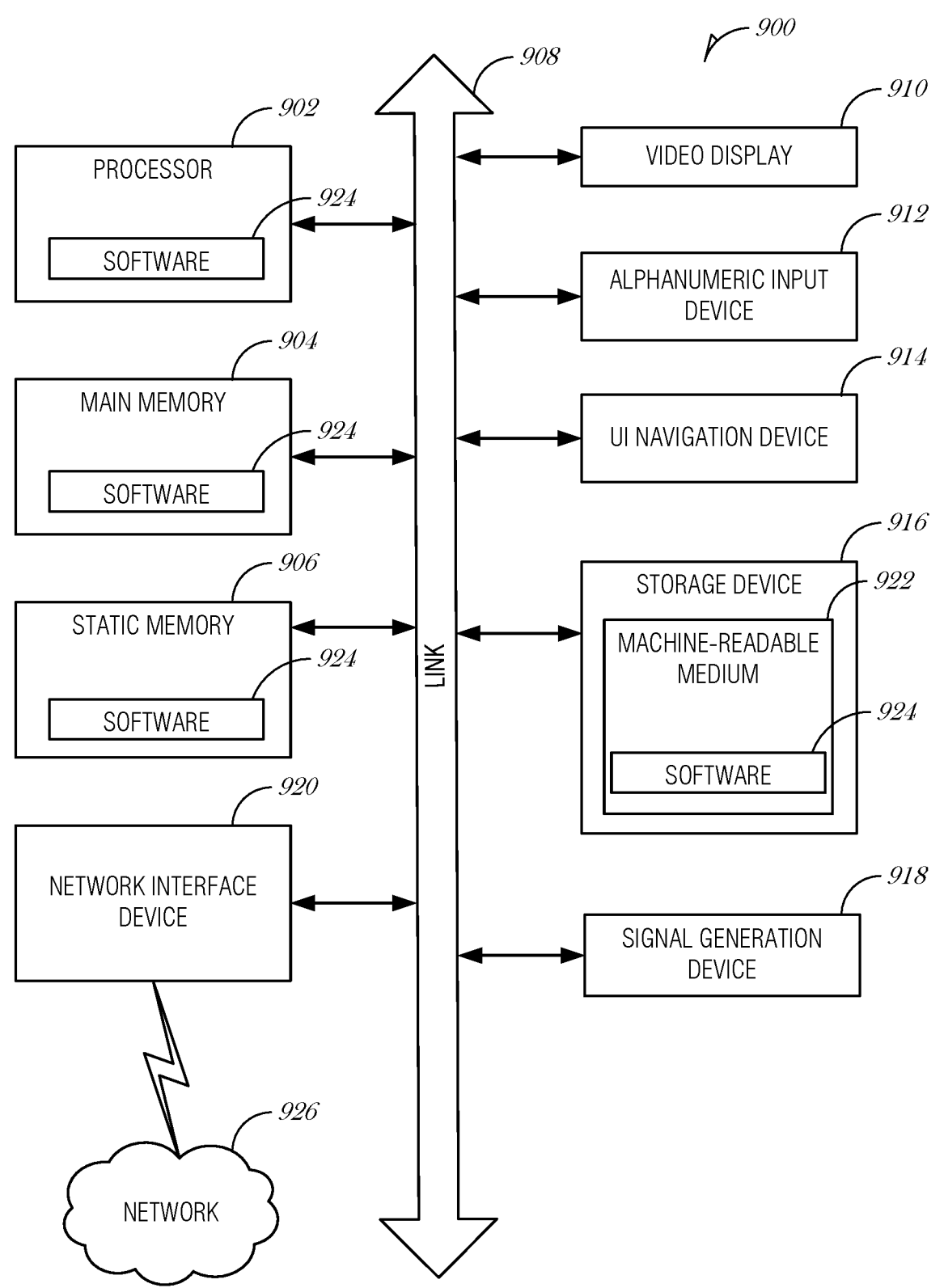
FIG. 9 is a block diagram illustrating an example machine upon which any one or more of the techniques (e.g., methodologies) discussed herein may perform, according to an example.

"Circuit" or "circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 9 is a block diagram illustrating a machine in the example form of a computer system 900, within which a set or sequence of instructions may be executed to cause the machine to perform any one of the methodologies discussed herein, according to an example. In alternative examples, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, a wearable device, a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one example, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyrometer, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is an object tracking system for a vehicle, the object tracking system comprising: an interface to communicate with object detection circuitry; and an object similarity calculator circuitry to: obtain segmented data of an environment the object tracking system is operating within, the segmented data obtained using a light imaging detection and ranging (LiDAR) system, and the segmented data including a first plurality of segments detected in a first frame and a second plurality of segments detected in a second frame, the second frame captured after the first frame; determine, for a given segment of the first plurality of segments, a similar segment in the second plurality of segments; assign an object identification of the given segment to the similar segment; and track the similar segment from the first frame to the second frame based on the object identification.

In Example 2, the subject matter of Example 1 includes, wherein the segmented data is produced by a filter and segmentation circuitry of the object detection circuitry.

In Example 3, the subject matter of Example 2 includes, wherein the filter and segmentation circuitry is communicatively coupled to the object tracking system via the interface.

In Example 4, the subject matter of Examples 1-3 includes, wherein to determine the similar segment in the second plurality of segments, the object similarity calculator circuitry is to compare features of the given segment identified in the first frame with features of the second plurality of segments identified in the second frame.

In Example 5, the subject matter of Example 4 includes, wherein the features include one or more of: radiometric parameters, spatial parameters, or structural parameters.

In Example 6, the subject matter of Example 5 includes, wherein the spatial parameters include one or more of: a mean height above ground, a minimum height above ground, or a left right distance from center.

In Example 7, the subject matter of Examples 5-6 includes, wherein the structural parameters include one or more of: a volume, a length, a breadth, or a height of the given segment.

In Example 8, the subject matter of Examples 5-7 includes, wherein the structural parameters include a number of LiDAR points in the given segment.

In Example 9, the subject matter of Examples 4-8 includes, wherein to compare features, the object similarity calculator circuitry is to calculate a similarity score.

In Example 10, the subject matter of Example 9 includes, wherein to calculate the similarity score, the object similarity calculator circuitry is to use a weighted function that weights each of a plurality of features.

In Example 11, the subject matter of Examples 4-10 includes, wherein to compare features, the object similarity calculator circuitry is to: determine a set of neighboring segments to the given segment based on a neighborhood radius; and compare features of the given segment to features in the set of neighboring segments.

In Example 12, the subject matter of Example 11 includes, wherein the neighborhood radius is based on a maximum distance of the given segment from all of the second plurality of segments.

In Example 13, the subject matter of Example 12 includes, wherein the maximum distance is measured from a centroid of the given segment to a centroid of a segment in the second plurality of segments.

In Example 14, the subject matter of Examples 11-13 includes, wherein the neighborhood radius is based on a percentage of the maximum distance of the given segment from all of the second plurality of segments.

In Example 15, the subject matter of Example 14 includes, wherein the percentage is 25%.

In Example 16, the subject matter of Examples 1-15 includes, wherein the segmented data is produced using an adaptive density-based technique.

Example 17 is a method of tracking objects with an object tracking system, comprising: obtaining segmented data of an environment the object tracking system is operating within, the segmented data obtained using a light imaging detection and ranging (LiDAR) system, and the segmented data including a first plurality of segments detected in a first frame and a second plurality of segments detected in a second frame, the second frame captured after the first frame; determining, for a given segment of the first plurality of segments, a similar segment in the second plurality of segments; assigning an object identification of the given segment to the similar segment; and tracking the similar segment from the first frame to the second frame based on the object identification.

In Example 18, the subject matter of Example 17 includes, wherein the segmented data is produced by a filter and segmentation circuitry of the object detection circuitry.

In Example 19, the subject matter of Example 18 includes, wherein the filter and segmentation circuitry is communicatively coupled to the object tracking system via the interface.

In Example 20, the subject matter of Examples 17-19 includes, wherein determining the similar segment in the second plurality of segments comprises comparing features of the given segment identified in the first frame with features of the second plurality of segments identified in the second frame.

In Example 21, the subject matter of Example 20 includes, wherein the features include one or more of: radiometric parameters, spatial parameters, or structural parameters.

In Example 22, the subject matter of Example 21 includes, wherein the spatial parameters include one or more of: a mean height above ground, a minimum height above ground, or a left right distance from center.

In Example 23, the subject matter of Examples 21-22 includes, wherein the structural parameters include one or more of: a volume, a length, a breadth, or a height of the given segment.

In Example 24, the subject matter of Examples 21-23 includes, wherein the structural parameters include a number of LiDAR points in the given segment.

In Example 25, the subject matter of Examples 20-24 includes, wherein comparing features comprises calculating a similarity score.

In Example 26, the subject matter of Example 25 includes, wherein calculating the similarity score comprises using a weighted function that weights each of a plurality of features.

In Example 27, the subject matter of Examples 20-26 includes, wherein comparing features comprises: determining a set of neighboring segments to the given segment based on a neighborhood radius; and comparing features of the given segment to features in the set of neighboring segments.

In Example 28, the subject matter of Example 27 includes, wherein the neighborhood radius is based on a maximum distance of the given segment from all of the second plurality of segments.

In Example 29, the subject matter of Example 28 includes, wherein the maximum distance is measured from a centroid of the given segment to a centroid of a segment in the second plurality of segments.

In Example 30, the subject matter of Examples 28-29 includes, wherein the neighborhood radius is based on a percentage of the maximum distance of the given segment from all of the second plurality of segments.

In Example 31, the subject matter of Example 30 includes, wherein the percentage is 25%.

In Example 32, the subject matter of Examples 17-31 includes, wherein the segmented data is produced using an adaptive density-based technique.

Example 33 is at least one machine-readable medium including instructions, which when executed by a machine, cause the machine to perform operations of any of the methods of Examples 17-32.

Example 34 is an apparatus comprising means for performing any of the methods of Examples 17-32.

Example 35 is at least one non-transitory machine-readable medium including instructions for tracking objects, the instructions when executed by an object tracking system capable of being installed in a vehicle, cause the object tracking system to perform the operations comprising: obtaining segmented data of an environment the object tracking system is operating within, the segmented data obtained using a light imaging detection and ranging (LiDAR) system, and the segmented data including a first plurality of segments detected in a first frame and a second plurality of segments detected in a second frame, the second frame captured after the first frame; determining, for a given segment of the first plurality of segments, a similar segment in the second plurality of segments; assigning an object identification of the given segment to the similar segment; and tracking the similar segment from the first frame to the second frame based on the object identification.

In Example 36, the subject matter of Example 35 includes, wherein the segmented data is produced by a filter and segmentation circuitry of the object detection circuitry.

In Example 37, the subject matter of Example 36 includes, wherein the filter and segmentation circuitry is communicatively coupled to the object tracking system via the interface.

In Example 38, the subject matter of Examples 35-37 includes, wherein determining the similar segment in the second plurality of segments comprises comparing features of the given segment identified in the first frame with features of the second plurality of segments identified in the second frame.

In Example 39, the subject matter of Example 38 includes, wherein the features include one or more of: radiometric parameters, spatial parameters, or structural parameters.

In Example 40, the subject matter of Example 39 includes, wherein the spatial parameters include one or more of: a mean height above ground, a minimum height above ground, or a left right distance from center.

In Example 41, the subject matter of Examples 39-40 includes, wherein the structural parameters include one or more of: a volume, a length, a breadth, or a height of the given segment.

In Example 42, the subject matter of Examples 39-41 includes, wherein the structural parameters include a number of LiDAR points in the given segment.

In Example 43, the subject matter of Examples 38-42 includes, wherein comparing features comprises calculating a similarity score.

In Example 44, the subject matter of Example 43 includes, wherein calculating the similarity score comprises using a weighted function that weights each of a plurality of features.

In Example 45, the subject matter of Examples 38-44 includes, wherein comparing features comprises: determining a set of neighboring segments to the given segment based on a neighborhood radius; and comparing features of the given segment to features in the set of neighboring segments.

In Example 46, the subject matter of Example 45 includes, wherein the neighborhood radius is based on a maximum distance of the given segment from all of the second plurality of segments.

In Example 47, the subject matter of Example 46 includes, wherein the maximum distance is measured from a centroid of the given segment to a centroid of a segment in the second plurality of segments.

In Example 48, the subject matter of Examples 45-47 includes, wherein the neighborhood radius is based on a percentage of the maximum distance of the given segment from all of the second plurality of segments.

In Example 49, the subject matter of Example 48 includes, wherein the percentage is 25%.

In Example 50, the subject matter of Examples 35-49 includes, wherein the segmented data is produced using an adaptive density-based technique.

Example 51 is at least one machine-readable medium including instructions that, when executed by processing circuitry, cause the processing circuitry to perform operations to implement of any of Examples 1-50.

Example 52 is an apparatus comprising means to implement of any of Examples 1-50.

Example 53 is a system to implement of any of Examples 1-50.

Example 54 is a method to implement of any of Examples 1-50.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An object tracking system for a vehicle, the object tracking system comprising:
an interface to communicate with object detection circuitry; and
an object similarity calculator circuitry to:
obtain segmented data of an environment the object tracking system is operating within, the segmented data obtained using a light imaging detection and ranging (LiDAR) system, and the segmented data including a first plurality of segments detected in a first frame and a second plurality of segments detected in a second frame, the second frame captured after the first frame;
determine, for a given segment of the first plurality of segments, a similar segment in the second plurality of segments,
wherein to determine the similar segment in the second plurality of segments, the object similarity calculator circuitry is to:
compare features of the given segment identified in the first frame with features of the second plurality of segments identified in the second frame, wherein to compare features, the object similarity calculator circuitry is to:

determine a set of neighboring segments to the given segment based on a neighborhood radius; and compare features of the given segment to features in the set of neighboring segments;

assign a unique object identifier of the given segment to the similar segment; and track the similar segment from the first frame to the second frame based on the unique object identifier.

2. The object tracking system of claim 1, wherein the segmented data is produced by a filter and segmentation circuitry of the object detection circuitry.

3. The object tracking system of claim 2, wherein the filter and segmentation circuitry is communicatively coupled to the object tracking system via the interface.

4. The object tracking system of claim 1, wherein the features include one or more of: radiometric parameters, spatial parameters, or structural parameters.

5. The object tracking system of claim 4, wherein the spatial parameters include one or more of: a mean height above ground, a minimum height above ground, or a left right distance from center.

6. The object tracking system of claim 4, wherein the structural parameters include one or more of: a volume, a length, a breadth, or a height of the given segment.

7. The object tracking system of claim 4, wherein the structural parameters include a number of LiDAR points in the given segment.

8. The object tracking system of claim 1, wherein to compare features, the object similarity calculator circuitry is to calculate a similarity score.

9. The object tracking system of claim 8, wherein to calculate the similarity score, the object similarity calculator circuitry is to use a weighted function that weights each of a plurality of features.

10. The object tracking system of claim 1, wherein the neighborhood radius is based on a maximum distance of the given segment from all of the second plurality of segments.

11. The object tracking system of claim 10, wherein the maximum distance is measured from a centroid of the given segment to a centroid of a segment in the second plurality of segments.

12. The object tracking system of claim 1, wherein the neighborhood radius is based on a percentage of the maximum distance of the given segment from all of the second plurality of segments.

13. The object tracking system of claim 12, wherein the percentage is 25%.

14. The object tracking system of claim 1, wherein the segmented data is produced using an adaptive density-based technique.

15. At least one non-transitory machine-readable medium including instructions for tracking objects, the instructions when executed by an object tracking system capable of being installed in a vehicle, cause the object tracking system to perform operations comprising:

obtaining segmented data of an environment the object tracking system is operating within, the segmented data obtained using a light imaging detection and ranging (LiDAR) system, and the segmented data including a first plurality of segments detected in a first frame and a second plurality of segments detected in a second frame, the second frame captured after the first frame;

determining, for a given segment of the first plurality of segments, a similar segment in the second plurality of segments, wherein determining the similar segment comprises:

comparing features of the given segment identified in the first frame with features of the second plurality of segments identified in the second frame, wherein comparing features comprises:

determining a set of neighboring segments to the given segment based on a neighborhood radius; and comparing features of the given segment to features in the set of neighboring segments;

assigning a unique object identifier of the given segment to the similar segment; and tracking the similar segment from the first frame to the second frame based on the unique object identifier.

16. A method of tracking objects with an object tracking system, comprising:

obtaining segmented data of an environment the object tracking system is operating within, the segmented data obtained using a light imaging detection and ranging (LiDAR) system, and the segmented data including a first plurality of segments detected in a first frame and a second plurality of segments detected in a second frame, the second frame captured after the first frame;

determining, for a given segment of the first plurality of segments, a similar segment in the second plurality of segments, wherein determining the similar segment comprises:

comparing features of the given segment identified in the first frame with features of the second plurality of segments identified in the second frame, wherein comparing features comprises:

determining a set of neighboring segments to the given segment based on a neighborhood radius; and comparing features of the given segment to features in the set of neighboring segments;

assigning a unique object identifier of the given segment to the similar segment; and tracking the similar segment from the first frame to the second frame based on the unique object identifier.

17. The method of claim 16, wherein the segmented data is produced using an adaptive density-based technique.

* * * * *